Oct. 7, 1958 C. E. CLAPPER 2,854,723
SHAFT GRIPPING CLAMP
Filed July 20, 1954

INVENTOR,
Clyde E. Clapper.
BY
Hamilton & Hamilton,
Attorneys.

2,854,723

SHAFT GRIPPING CLAMP

Clyde E. Clapper, Blue Springs, Mo.

Application July 20, 1954, Serial No. 444,571

1 Claim. (Cl. 24—249)

This invention relates to improvements in a shaft gripping clamp and has particular reference to shaft clamp suitable for adjustably securing an umbrella shaft to a farm vehicle such as a tractor.

Other objects are simplicity and economy of construction, ease and efficiency of operation, and adaptability for use wherever a shaft is to be adjustably mounted for positioning a sun shade to the varying positions of the sun or any use wherever easy and quick adjustment of the parts being carried is required.

With these objects in view as well as other objects which will appear during the course of the specification, reference will be had to the drawing wherein.

Figure 1:
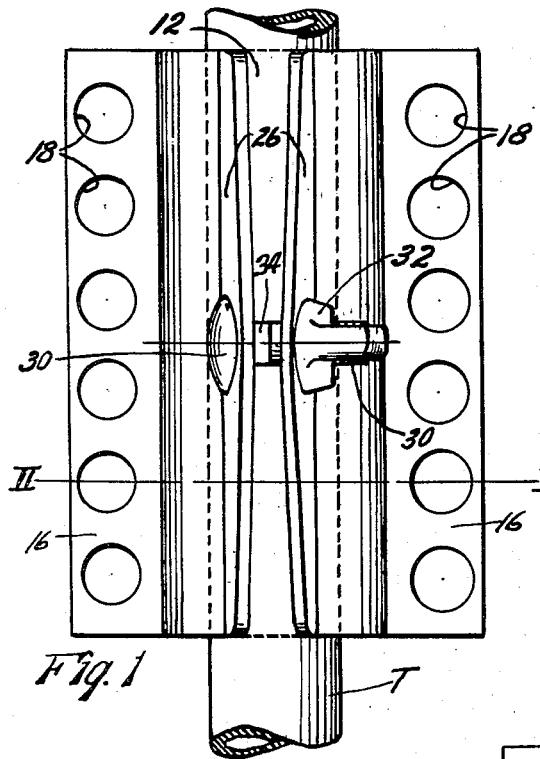
Fig. 1 is an elevational view of the shaft gripping device, shown in operative relation on a shaft.

Throughout the several views of the drawing, like numerals refer to similar parts and the numeral 10 designates a base plate having an offset portion 12 provided with slots 14. Said base plate also has outturned flanges 16 disposed in relative planar relation and each having a series of holes 18 formed therein to facilitate anchorage.

It will be noted that this base plate is symmetrical in form and is adapted to carry a shaft or tube T in parallel longitudinal relation thereto.

Figure 2:
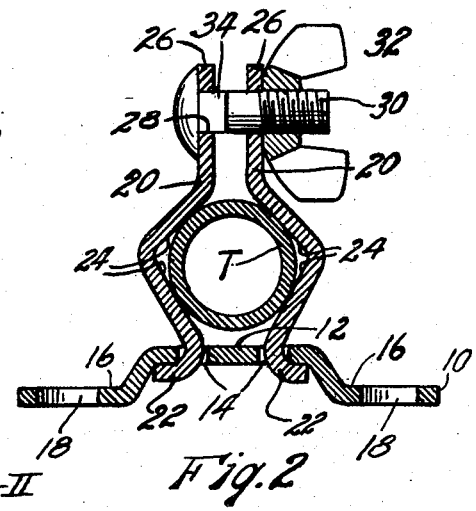
Fig. 2 is a sectional view taken on line II—II of Fig. 1 with parts broken away to show the screw clamping means.
Figure 3:
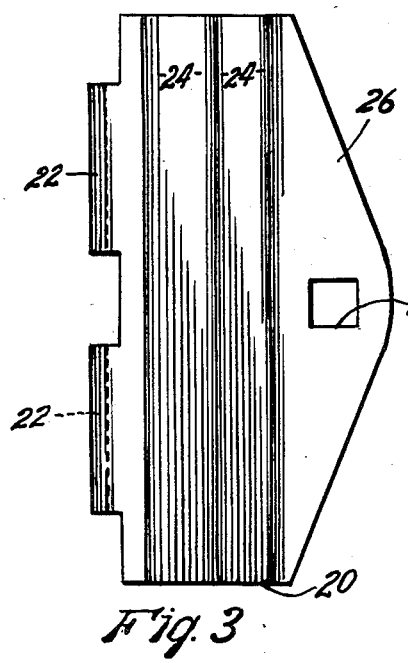
Fig. 3 is a detached elevational view of one of the clamping arms.
Figure 4:
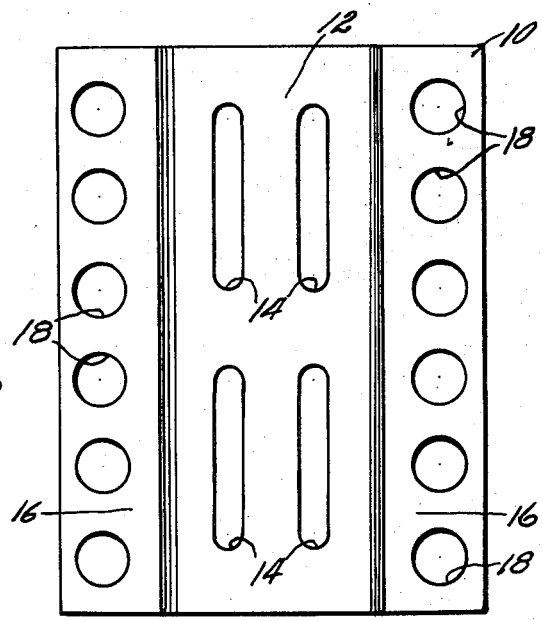
Fig. 4 is an elevational view of the base member.

Two like shaft gripping arms 20 formed from sheet metal as shown in Figs. 1, 2 and 3, constitute the pipe gripping plates. It will be noted that the outer edge of each plate is formed with outturned hook members 22 which are adapted to be fitted into slots 14 for pivotal movement. The body portions of each of the arms 20 are longitudinally offset to present two gripping faces 24 to longitudinally contact the body of tube T positioned therebetween (see Figs. 1 and 2). These faces 24 are disposed at substantially 90° to each other and will serve to grip pipes of different diameters within a limited range. The outer flange 26 or 20 is provided adjacent its central outer portion with a squared hole 28 having dimensions equivalent to the diameter of the tightening bolt 30 extending through the two flanges and provided with a nut 32 to draw the two arms together to grip the tube. Bolt 30 is shown as a carriage bolt having a squared section 34 under the head to prevent turning of the bolt when the nut is being set. This nut is shown as a winged nut to facilitate rapid operation of the clamping device.

It will be noted that tube T will be engaged along four spaced apart longitudinal lines of contact for gripping the tube without any chance of crushing the tube. Larger or smaller tubes may be gripped by this clamp member so long as it is within the working range of this particular clamp.

What I claim as new and desire to protect by Letters Patent is:

A shaft gripping clamp comprising a base member having slots formed therein along two parallel lines, a pair of shaft gripping arms elongated in the direction of said slots and each having a plurality of spaced apart hooks formed along one edge thereof and engaged pivotally in one of said lines of slots, the confronting faces of said arms being shaped to engage a shaft therebetween, and means for drawing together the edges of said arms opposite said hooks.

References Cited in the file of this patent

UNITED STATES PATENTS

| 549,731 | Lantau | Nov. 12, 1895 |
| 1,635,200 | Zilliox | July 12, 1927 |
| 2,628,796 | Krizman | Feb. 17, 1953 |
| 2,761,714 | Cuskie | Sept. 4, 1956 |

FOREIGN PATENTS

| 462,115 | Germany | July 3, 1928 |
| 524,708 | Great Britain | Aug. 13, 1940 |